Feb. 24, 1953     W. K. HOOPER     2,629,835
MULTIPLE ANGLE PIEZOELECTRIC SEARCHING UNIT
Filed Dec. 20, 1949
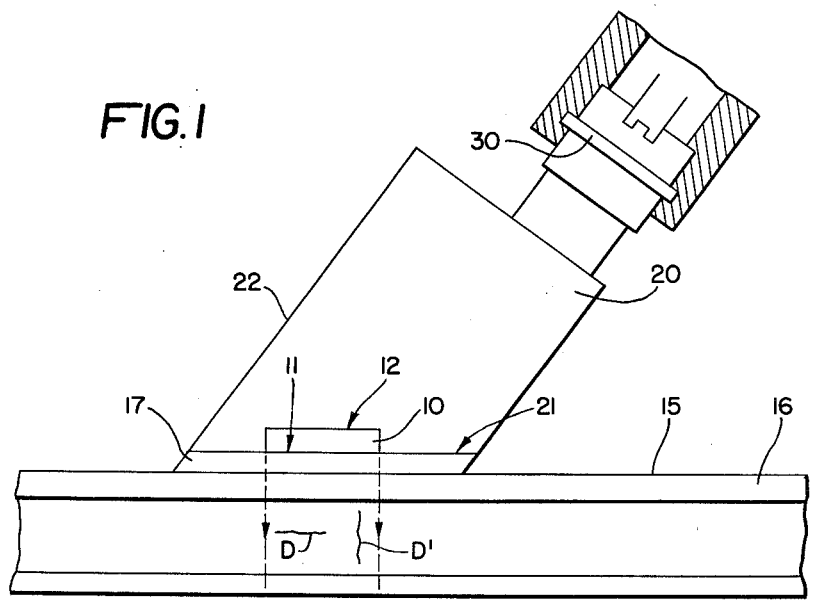
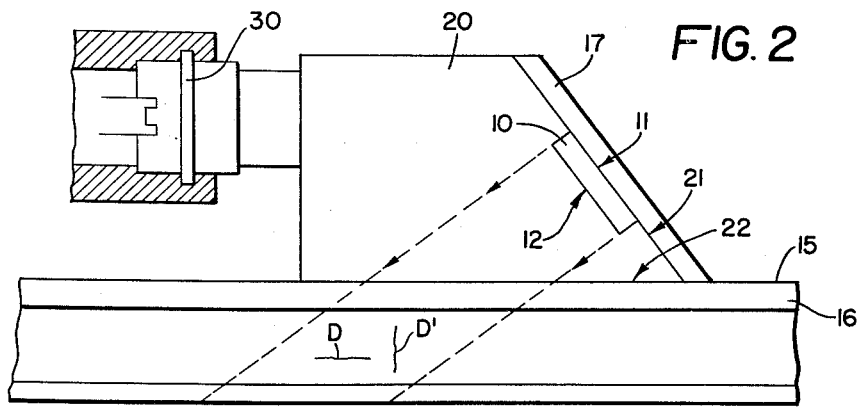
*INVENTOR.*
WILLIAM K. HOOPER
BY
*Joseph H. Lipschutz*
ATTORNEY.

Patented Feb. 24, 1953

2,629,835

UNITED STATES PATENT OFFICE 2,629,835

MULTIPLE ANGLE PIEZOELECTRIC SEARCHING UNIT

William K. Hooper, Brookfield Center, Conn., assignor to Sperry Products, Inc., Danbury, Conn., a corporation of New York Application December 20, 1949, Serial No. 133,991

3 Claims. (Cl. 310—8.7)

This invention relates to piezo-electric elements, such as quartz crystals, which are utilized in the transmission of vibrational waves into objects for the purpose of inspection. Such crystals may be operated at ultrasonic frequencies for the purpose of transmitting and receiving beams which are highly directional so that any desired portion of an object may be scanned. This method of inspection depends upon the reflection of the transmitted beam by a discontinuity or other reflecting surface. The reflection from the reflecting surface depends upon its angular relation with respect to the transmitted beam—the strongest reflection being obtained when the reflecting surface is normal to the transmitted beam, and the weakest reflection (or none at all) being obtained when the reflecting surface is in the line of transmission of the beam. Therefore, it has been found necessary in such inspection procedure to make provision for transmitting the beam into the object to be inspected in a plurality of directions angularly displaced. For this purpose a plurality of crystals has been employed, each separately mounted, and each requiring connection to and disconnection from the energizing system to permit substitution of another crystal.

It is therefore the principal object of this invention to provide a single crystal in a single holder which will permit the transmission and reception of ultrasonic beams in a plurality of angular directions without the necessity of connecting and disconnecting a plurality of elements from the energizing source and from the crystal holder.

Further objects and advantages of this invention will become apparent in the following detailed description thereof.

In the accompanying drawings,

Fig. 1 is a front elevation, partly sectioned vertically, of one embodiment of this invention in position to transmit vibrational waves into an object to be inspected in a direction normal to the entering surface of the object.

Fig. 2 is a view of the Fig. 1 device in position to transmit vibrational waves into the object at an angle to the entering surface.

Referring to Fig. 1, there is shown a piezoelectric element in the form of a crystal 10 adapted to be oscillated from an electric oscillatory circuit (not shown) to transform the electric oscillations into mechanical vibrations. The crystal has front and rear surfaces 11 and 12 from both of which vibrational waves radiate. The face 11 may be applied directly to the entering surface 15 of the object 16 to be inspected, or a face plate 17 of metal or other suitable material may be provided on surface 11. The object 16 is shown in this instance as a rail. The surface 11 is parallel to surface 15 and vibrational waves will therefore be transmitted into object 16 in a direction normal to the entering surface 15. This direction of transmission is suited to the detection of defects such as D which are so positioned as to intercept and reflect the waves entering normal to surface 15. However; it will be seen that with respect to a defect such as D' positioned substantially parallel to this direction of transmission, little interception and therefore little reflection will take place.

For this reason it has been customary to employ another crystal so mounted as to transmit the vibrational waves into object 16 at an angle to normal with respect to the entering surface 15. By this invention, however, I provide means whereby the same crystal 10 which is employed for normal or rectilinear transmission and reception, may be employed for angular transmission and reception without disconnection from the electrical energizing source and without removal from its holder. For this purpose the crystal is mounted in a holder 20 which may have one surface 21 parallel to crystal surfaces 11 and 12, and another surface 22 at angle to surface 21. Therefore when surface 22 is placed in engagement with entering surface 15 of object 16 as in Fig. 2, the surfaces 11 and 12 will be disposed at an angle to surface 22, and vibrational waves generated by the crystal will be transmitted through holder 20 and into object 16 at an angle to normal. The material of holder 20 is of low acoustic impedance so as to transmit the generated waves with a minimum of attenuation. One suitable material of the plastics groups is Plexiglas (methyl methacrylate). Reflections from reflecting surfaces such as D' will also travel the same angular path back to, and be received by, the crystal.

A swivel joint, indicated at 30, may be provided to facilitate adjustment of the holder to its varying positions.

Having described my invention, what I claim and desire to secure by Letters Patent is:

1. A multiple angle piezo-electric searching unit for inspecting an object, comprising a crystal having substantially parallel faces for transmitting and receiving vibrational waves, a holder for said crystal having a plurality of working surfaces each of which is adapted for engagement with the object, one of said surfaces being substantially parallel to said crystal faces, said holder having another of said working surfaces disposed at an angle to said first surface, said angle being such that said last-named working surface intercepts vibrational waves transmitted in a direction normal to said crystal faces.

2. A multiple angle piezo-electric searching unit for inspecting an object, comprising a crystal having substantially parallel faces for transmitting and receiving vibrational waves, a holder for said crystal having a plurality of working surfaces each of which is adapted for engagement with the object, one of said surfaces being substantially parallel to said crystal faces, said holder having another of said working surfaces disposed at an angle to said first surface, said angle being such that said last-named working surface intercepts vibrational waves transmitted in a direction normal to said crystal faces, said holder being formed of a material having low acoustic impedance.

3. A multiple angle piezo-electric searching unit for inspecting an object, comprising a crystal having substantially parallel faces for transmitting and receiving vibrational waves, a holder for said crystal having a plurality of working surfaces each of which is adapted for engagement with the object, one of said working surfaces being substantially parallel to said crystal faces, said holder having another of said working surfaces disposed at an angle to said first surface, said angle being such that said last-named working surface intercepts vibrational waves transmitted in a direction normal to said crystal faces, and a swivel mounting for said holder.

WILLIAM K. HOOPER.

REFERENCES CITED

The following references are of record in the file of this patent:

UNITED STATES PATENTS

| Number | Name | Date |
| --- | --- | --- |
| 1,495,429 | Nicolson | May 27, 1924 |
| 2,443,178 | Benioff | June 15, 1948 |
| 2,505,867 | Meunier | May 2, 1950 |
| 2,525,861 | Carlin | Oct. 17, 1950 |
| 2,540,720 | Forbes | Feb. 6, 1951 |